United States Patent
Kitai

[15] 3,683,768
[45] Aug. 15, 1972

[54] FLASH PHOTOGRAPHY CHANGEOVER DEVICE

[72] Inventor: Kiyoshi Kitai, Tokyo, Japan
[73] Assignee: Kabushiki Kaisha Hattori Tokeiten, Tokyo, Japan
[22] Filed: Feb. 25, 1969
[21] Appl. No.: 802,175

[52] U.S. Cl. ............... 95/10 C, 95/11.5, 95/53 EB
[51] Int. Cl. ............................................. G01j 1/52
[58] Field of Search..95/11, 11.5, 10 C, 10 CT, 53 E, 95/53 EB

[56] References Cited
UNITED STATES PATENTS

| | | | |
|---|---|---|---|
| 3,250,193 | 5/1966 | Horton | 95/64 X |
| 3,270,650 | 9/1966 | Ernisse | 95/10 C X |
| 3,374,718 | 3/1968 | Hochreiter | 95/10 C |
| 3,393,620 | 7/1968 | Reiche et al. | 95/11 |
| 3,439,597 | 4/1969 | Wagner | 95/11.5 |
| 3,439,595 | 4/1969 | Kiper | 95/10 C |
| 3,535,989 | 10/1970 | Kitai | 95/11.5 R |
| 3,535,991 | 10/1970 | Kitai | 95/11.5 R |

*Primary Examiner*—Samuel S. Matthews
*Assistant Examiner*—Robert P. Greiner
*Attorney*—Robert E. Burns and Emmanuel J. Lobato

[57] ABSTRACT

Apparatus in a camera for sensing the brightness of a subject to be photographed and devices for giving a visual indication to the camera operator whether or not a flash unit utilized with the camera is in an operative condition. In addition, apparatus is provided for automatically taking a picture of the subject using the ambient light if there is sufficient ambient light and for energizing the flash unit if there is insufficient ambient light. The apparatus also automatically takes a picture of the subject using ambient light if the flash unit is defective.

7 Claims, 3 Drawing Figures

FLASH PHOTOGRAPHY CHANGEOVER DEVICE

The present invention relates to a camera having apparatus for determining whether or not a flash unit associated with the camera is in its operative state and a visual signalling device including a pilot lamp which is energized to indicate to the camera operator that the flash unit is in its operative state when this is in fact the case.

It is an object of the present invention to provide in a camera improved apparatus for taking an exposure.

It is another object of the present invention to provide improved means for detecting and giving visual indication to the camera operator of the condition of a flash unit associated with the camera.

Having in mind the above and other objects that will be evident from an understanding of this disclosure, the invention comprises the devices, combinations and arrangements of parts as illustrated in the presently preferred embodiments of the invention which is hereinafter set forth in such detail as to enable those skilled in the art readily to understand the function, operation, construction and advantages of it when read in conjunction with the accompanying drawings.

DESCRIPTION OF THE PREFERRED EMBODIMENTS

Figure 1:
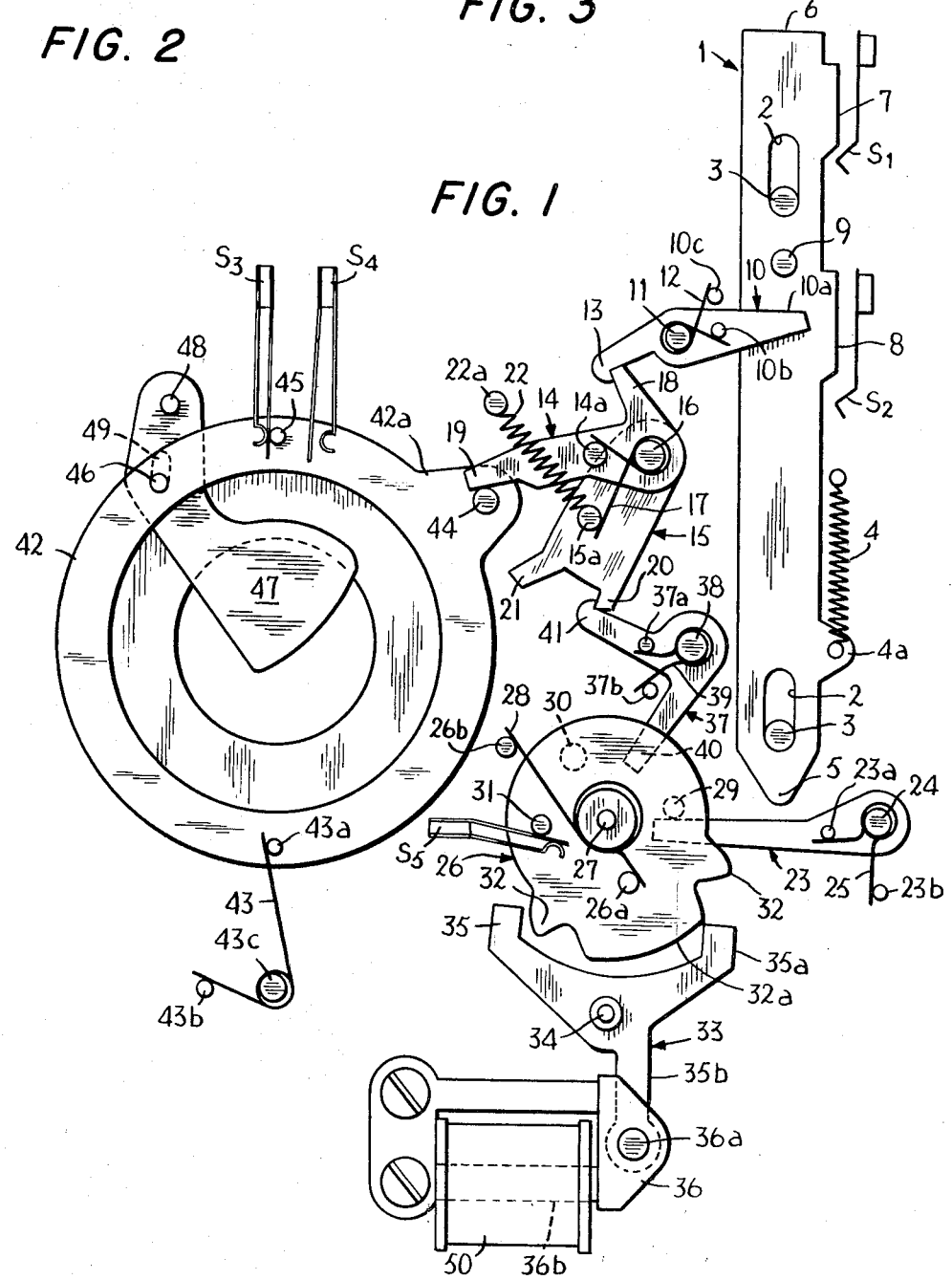
FIG. 1 is a diagrammatic illustration of a portion of the apparatus of the present invention.

Referring now to the drawings, FIG. 1 discloses an elongated manually operable trigger lever 1 having formed therein at opposite end sections of the lever a pair of elongated guide slots each of which receives a corresponding one of a pair of fixed guide pins 3 which permit restricted lever movement in the vertical direction. On the right side (FIG. 1) of the lever 1 there is formed a plurality of protrusions that extend outwardly away from the main body of the lever 1, including a tab 4a to which is secured one end of a coil spring 4, the other end of which is secured to a fixed pin, the spring being arranged to bias the lever 1 upwardly (FIG. 1) to the released position of the trigger lever. The other protrusions 7 and 8 form switch contacting or actuating surfaces which are arranged to contact and actuate the switches S1 and S2, respectively, when the lever 1 is depressed, the function of which will be described below. The ever 1 further includes a lever contacting end 5 a the lower end of the lever and an upper end 6 while intermediate the ends of the lever 1 there is mounted a lever actuating pin 9.

Pivotally mounted on a shaft 11 is an elongated hook lever 10 having a pin contacting arm 10a arranged in the path of the pin 9 so that when the lever is pressed a predetermined distance the pin 9 will be brought into contact with the pin contacting arm 10a. The other end of the elongated hook lever 10 is formed with a hook 13 while a spring 12 which is wrapped about the shaft 11 intermediate the spring ends includes end sections, one of which contacts a pin 10b on the arm 10a and the other of which contacts a fixed pin 10c, the spring 12 serving to bias the hook lever 10 in a counterclockwise (FIG. 1) direction. The hook 13 of the elongated hook lever 10 normally engages the end section of a locking arm 18 of a substantially V-shaped lever 14 the other arm of which is a pin contacting arm 19, while intermediate the arm there is mounted a pin 14a. The V-shaped lever 14 is pivotally mounted substantially at the juncture of its arms on a shaft 16. Wrapped about the shaft 16 is a spring 17 one end of which contacts the pin 14a and the other end of which contacts a pin 15a mounted upon an elongated intermediate lever 15 and in such a manner as to bias the V-shaped lever 14 and the elongated intermediate lever 15, which is pivotally mounted by one end on the shaft 16, so that the lever 15 and the pin contacting arm 19 tend to move toward each other about the shaft 16 in a scissors-like action. Secured by one end to the pin 15a and by the other end to a fixed pin 22a is a coil spring 22 which serves to bias the lever 15 in a clockwise (FIG. 1) direction. The free end of the elongated intermediate lever 15 includes a pin contacting finger 21 and a locking finger 20 spaced from the pin contacting finger 21 and a locking finger 20 spaced from the pin contacting finger 21, the locking finger 20 being arranged normally to engage hook 41 formed at the end of one arm of a substantially V-shaped hook lever 37 that is pivotally mounted on a shaft 38 substantially at the juncture of the arm of the substantially V-shaped lever 37, the other arm of the V-shaped lever 37 being a pin contacting arm 40. Wrapped about the shaft 38 is a spring 39 one end of which contacts a pin 37a mounted upon one of the two arms of the lever 37, the other end of the spring 39 being in contact with a fixed pin 37b, thereby to bias the lever 15 in a clockwise (FIG. 1) direction.

Directly beneath the V-shaped hook lever 37, as seen in FIG. 1, there is pivotally mounted on a shaft 27 a substantially disc-shaped cam plate 26 having formed on one face a switch actuating pin 31 arranged in the path of a switch S5 and on the opposite face of the cam plate 26 and diametrically opposite the pin 31 is a lever contacting pin 29. The substantially disc-shaped cam plate 26 includes a pair of spaced ears 32 extending outwardly from the periphery of the cam plate and separated by a tail section 32a. The cam plate 26 also includes a pin 26a mounted on one face of the cam and in contact with one end section of a spring 28 that is wrapped around the shaft 27, the other end section of the spring 28 being in contact with a fixed pin 26b, the spring 28 serving to bias the cam plate in a clockwise direction. There is also mounted on the same face of the cam plate 26 that the pin 29 is mounted on, a pin 30 that is arranged in the path of the pin contacting arm 40 as is the pin 29, when the cam plate 26 is rotated in an appropriate direction. The pin 29 is also arranged in the path of the free end section of an elongated locking lever 23 that is pivotally mounted by its other end section on a shaft 24 about which is wrapped a spring 25. One end of the spring 25 is in contact with a pin 23a mounted on the lever 23 while the other end of the spring 25 is in contact with a fixed pin 23b, thereby to bias the lever 23 in a clockwise direction (FIG. 1). A type of escapement mechanism includes a substantially Y-shaped pawl 33 that is pivotally mounted on a shaft 34 substantially at the juncture of the arms 35 and 35a and the lower or support arm 35b. An armature 36 is pivotally mounted on a pin 36a mounted on the free end of the support arm 35b to connect same to the iron core 36b of an electromagnet 50. It is noted that the section of the cam plate 26, which forms part of the escapement mechanism, that includes the tail section 32a is received in the space between the arms 35 and 35a of the Y-shaped pawl 33. The cam plate 26, locking lever 23 and intermediate lever 15 comprise exposure terminating means coacting with the ring 43 to effect termination of the exposure.

A ring 42 includes a tab 42a protruding radially of the ring on which is mounted a pin 44 which is positioned in the path of the pin contacting arm 19 of the V-shaped lever 14. Mounted on the periphery of the ring 42 is a pin 43a which engages one end of a spring 43 that is wrapped about a shaft 43c, the other end of the spring 43 being arranged to engage a fixed pin 43b, the spring 43 serving to bias the ring 42 in a counterclockwise direction. Also mounted on the ring 42 is a switch actuating pin 45 and spaced therefrom a shutter pin 46 that is received in an elongated slot 49 formed in one sector blade 47 of a plurality of sector blades as are utilized in a conventional shutter. The sector blade 47 is pivotally mounted by one end section on a shaft 48. The switch actuating pin 45 is arranged in the path of and between a timing switch S3 and a synchro switch S4.

Figure 2:
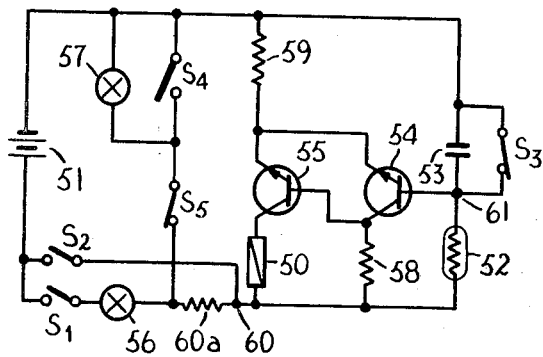
FIG. 2 is an schematic representation of the electrical circuit for the present invention.

Turning now to the circuit shown in FIG. 2, there is shown a self-contained electrical energy source or battery 51 having a positive side connected to one side of the switches S1 and S2 which are connected in parallel, the other side of the switch S2 being connected to one side of a resistor 60a at a junction point 60, the other side of the resistor 60a being connected to one side of a normally closed pilot lamp switch S5 and to a flash 56 (which includes an electronic flash unit or a throw away flash bulb) which is connected in series between the resistor 60a and the other side of the switch S1. The other side of the normally closed pilot lamp switch S5 is connected to one side of the synchro switch S4 and a signal pilot lamp 57 which are in turn connected in parallel to the negative side of the battery 51. The junction point 60 is electrically connected to one side of the electromagnet 50, resistor 58, and a photoconductive element 52. The other side of the electromagnet 50 is electrically connected to the collector of a transistor 55 whose emitter is connected through a resistor 59 to the negative side of the battery 51. The other side of the resistor 58 is connected to the base of the transistor 55 and to the collector of a transistor 54 the emitter of which is connected to the emitter of the transistor 55 and the base of which is connected to a junction point 61. The junction point 61 is electrically connected to the other side of the photoconductive element 52 and to one side of a capacitor 53 and the timing S3 which are connected in parallel to the negative side of the battery 51. In the delay or timing circuit, when the junction point 61 is electrically connected to the negative side of the battery 51 the transistor 54 will not conduct because of the low voltage between the base and the emitter of the transistor 54 in which case the voltage between the base and emitter of the transistor 55 is high thereby placing the transistor in its conducting state, which in turn causes the electromagnet 50 to be energized. The transistor 54 will begin to conduct when the timing switch S3 opens and the condensor 53 is charged to a predetermined voltage. When the transistor 54 conducts the voltage between the base and the emitter of the transistor 55 drops and the transistor ceases to conduct, thereby deenergizing the electromagnet 50.

Figure 3:
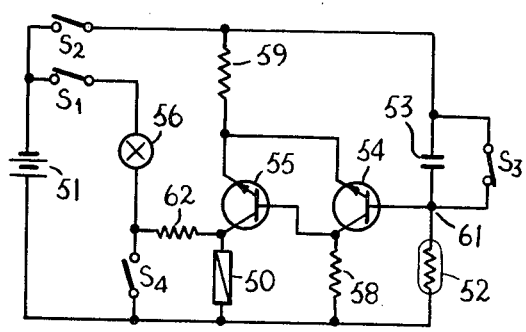
FIG. 3 is a schematic representation of another embodiment of the electrical circuit for the present invention.

FIG. 3 shows another embodiment of the present invention wherein the circuit is somewhat simplified relatively to the circuit shown in FIG. 2. First, the positive side of the battery 51 is connected to one side of the synchro switch S4, one side of the electromagnet 50, one side of the resistor 58, and one side of the photoconductive element 52. The negative side of the battery 51 is connected to one side of the switch S1 the other side of the switch being connected to the flash bulb 56 the other side of which is connected to the other side of the synchro switch S4 and to a resistor 62. The other side of the resistor 62 is connected to the collector of the transistor 55 which is also connected to the other side of the electromagnet 50. The negative side of the battery 51 is also connected through a switch S2 to one side of the resistor 59, the capacitor 53 and the timing switch S3, as in FIG. 2, the rest of the circuit being the same as the circuit shown in FIG. 2, it being noted that the pilot lamp 57 and the pilot lamp switch S5 have been deleted.

In operation and starting from the position of the various elements as shown in FIG. 1, when the trigger lever 1 is depressed the first switch S1 is closed as it comes into contact with the switch contacting surface 7, thereby closing the circuit through the switch S1, flash bulb 56, resistor 60a, and the elements to which they are electrically connected. In addition, by closing the switch S1 the circuit for the pilot lamp 57 is also closed since the normally closed switch S5 is in its normal position and the pilot lamp is thereby lit indicating that the flash circuit for the unit is ready for operation. Since, at this point, the transistor 55 is in its conducting state the electromagnet 50 is energized thereby holding the armature 36 in a fixed position so that the Y-shaped pawl 33 is also held in a fixed position, whereby the left ear 32 of the cam plate 26 is engaged by the inner surface of the arm 35 of the pawl 33. In such a position even though the trigger lever is further depressed to pivot the locking lever 23 away from the pin 29 which would ordinarily allow the cam plate 26 to pivot in a clockwise direction, the cam plate 26 will not pivot in a clockwise direction because the inner surface of the arm 35 will be engaged by the ear 32 to prevent such movement. It is noted that although there is a current flowing through the circuit sufficient to energize the pilot lamp and the electromagnet 50 it is not of such magnitude as would be necessary to actuate the flash bulb 56 through which the current is flowing.

As the trigger lever 1 is further depressed the lever actuating pin 9 is brought into engagement with and moves the arm 10a downwardly thereby to rock the lever 10 in a clockwise direction and release the hook 13 from engagement with the locking arm 18, thereby to permit the V-shaped lever 14 to rotate in a counterclockwise direction due to the bias exerted by the spring 17, and bring the arm 19 of the lever 14 into contact with the pin 44 of the ring 42. Thus, as the V-shaped lever 14 rotates in a counterclockwise direction the arm 19 moves the ring 42 through the pin 44 in a clockwise direction thereby opening the switch S3 as the pin 45 moves away from contact therewith and into engagement with the switch S4 which is thereby closed. As the timing switch S3 is opened the condenser 53 begins to charge, however, if the subject which the camera operator desires to photograph is not illuminated by sufficient light the resistance of the photoconductive element 52 remains high and therefore the current through the element 52 remains low, thereby restricting the charge on the condenser 53. Thereafter, as the pin 45 closes the synchro switch S4 the flash bulb 56 is connected directly to the battery and the flash bulb is actuated. When the flash bulb is actuated a large current is drawn from the electrical energy source thereby instantaneously lowering the voltage of the energy source, which, in turn, deenergizes the electromagnet 50. With the electromagnet 50 deenergized the Y-shaped pawl 33 is free to pivot on the shaft 34 thereby allowing the cam plate 26 to rotate in a clockwise direction by the spring 28 because the arm 35 of the pawl 33 no longer blocks the movement of the ear 32. As the cam plate 26 rotates in a clockwise direction the pin 30 will be brought into contact with the pin contacting arm 40 thereby to rotate the V-shaped hook lever 37 in a counterclockwise direction. The counterclockwise movement of the lever 37 brings the hook out of engagement with the finger 20 of the lever 15 thereby releasing that lever so that the coil spring 22 will rotate the lever 15 in a clockwise direction (FIG. 1). As the lever 15 rotates in a clockwise direction the finger 21 is brought into engagement with the pin 44 of ring 42 which thereafter rotates in a counterclockwise direction thereby rotating the sector blade 47 to close said blade which had been previously opened when the ring 42 was moved in the clockwise direction to allow the light reflected by the subject to enter the lens opening and expose the film strip in the camera. It is noted that since the drive pin 30 starts from the position shown in FIG. 1 after the flash bulb is actuated, it is possible in the present invention to obtain a low speed exposure that is synchronized with the actuation of the flash bulb.

However, when the camera operator wishes to take a photograph utilizing natural daylight only and has removed the flash bulb or on the other hand when the flash apparatus is disabled or inoperative for one reason or another, the pilot lamp 57 will not be lit when the trigger lever 1 is depressed even though the switch is closed. Thus, it is possible for the operator quickly to be apprised of the condition of the flash equipment when he depresses the lever 1. Furthermore, with the flash apparatus in such a disabled condition even though the switch S1 is closed there will be no voltage present at the junction point 60, therefore the electromagnet 50 will not be energized Since the electromagnet 50 is not energized, when the trigger lever 1 is depressed so that the end of that lever is brought into contact with the arm of lever 23 thereby to pivot the arm in a counterclockwise direction, the cam plate 26 is rotated in a clockwise direction due to the urging of the spring 28 because the pawl 35 will not prevent the clockwise movement of the cam plate 26. Upon movement of the cam plate 26 a distance equivalent to the width of the ear 32 the switch contacting surface 8 is brought into engagement with the switch S2 thereby closing that switch and the circuit. With the circuit closed, the electromagnet 50 is energized since the transistor 55 is now in its conducting state and the armature is thereby held by the electromagnet which prevents further movement of the pawl 33 and in addition stops the rotation of the cam plate 26. Next, the downward movement of the trigger lever 1 brings the lever actuating pin 9 into contact with the arm 10a thereby to rotate the lever 10 in a clockwise direction. As the lever 10 is rotated in a clockwise direction, the hook 13 is freed from engagement with the locking arm 18 of the V-shaped lever and the lever 14 thereafter is pivoted in a counterclockwise direction by the spring 17 bringing the arm 19 into contact with the pin 44 which thereafter rotated the ring 42 in a clockwise direction. As the ring 42 rotates in a clockwise direction the pin 45 is moved out of engagement with the timing switch S3 and that switch is opened to energize the timing. At this point, the current passed by the photo conductive element 52 corresponding in magnitude to the brightness of the subject being photographed comprises a timing signal which charges the condenser 53. When the charge on the condenser 53 reaches a predetermined voltage the transistor 54 begins to conduct, thereby taking the transistor 55 out of its conducting state, which in turn deenergizes the electromagnet 50. Since the electromagnet 50 is now deenergized, the pawl 33 is free to pivot about the shaft 34 once again and the disc-shaped cam 26 may rotate again in the clockwise direction. As the plate 26 rotates in a clockwise direction, the pin 30 is brought into engagement with the lever 37, thereby freeing the finger 20 from locking engagement with the hook 41, so that the lever 15 can rotate in a clockwise direction. As the lever 15 is urged in a clockwise direction by the spring 22 the finger 21 is brought into engagement with the pin 44 thereby to rotate the ring 42 in a counterclockwise direction and closing the sector blade 47 which had previously been opened by the rotation of the ring 42 in a clockwise direction. Thus, it is possible in the arrangement shown to take a photograph using daylight only without the flash bulb. It should be noted that if there is not sufficient light the photoconductive element will not conduct sufficiently and the transistor 54 will not be placed into its conducting state and the shutter blade will not be opened.

What I claim and desire to secure by letters patent is:

1. A photographic shutter control system for controlling a camera shutter mechanism comprising: a shutter mechanism movable from a closed position to an open position and back to said closed position within a variable set time period defining an exposure time period; a movable trigger lever; actuating means operative in response to movement of said trigger lever in a given direction to effect opening movement of said shutter mechanism to said open position; electromagnetic means energized in response to movement of said trigger lever in said given direction and operative when deenergized to effect return movement of said shutter mechanism to said closed position; flash circuit means including a flash bulb operative in response to opening movement of said actuating means to fire said flash bulb and deenergize said electromagnetic means whereby said shutter mechanism is returned to said closed position; timing circuit means operable independently of said flash circuit means and in response to opening movement of said shutter mechanism for providing a timing signal representative of a predetermined exposure time period; and electric circuit means receptive of said timing signal whenever said flash circuit means is ineffective to fire said flash bulb to maintain said shutter mechanism in said open position for said predetermined exposure time period and deenergize said electromagnetic means whereby said shutter mechanism is returned to said closed position.

2. A control system according to claim 1; wherein said timing circuit means includes a photosensitive element whose electrical resistance varies in accordance with the intensity of light incident thereon effective to provide a corresponding timing signal 3. A control system according to claim 1; including indicating means for providing an indication that said flashing circuit means is effective to fire said flash bulb.

4. A control system according to claim 1; wherein said electric circuit means includes a transistor receptive of and rendered conductive by said timing signal to effect deenergization of said electromagnetic means.

5. A control system according to claim 1; wherein said flash circuit means comprises means connectable during use of the control system to an electrical energy source having sufficient potential to fire said flash bulb, and conductor means electrically connecting said electromagnetic means to said flash bulb to apply the voltage drop occurring across said energy source when said flash bulb is fired to said electromagnetic means to deenergize same.

6. A photographic shutter control system for controlling a shutter comprising: trigger means movable in a given direction for releasing the shutter and initiating an exposure; exposure terminating means for effecting termination of the exposure and including a movable member mounted to follow the movement of said trigger means before the release of the shutter; and electric circuit means comprising an electromagnet operative when energized to terminate the following movement of said movable member, brightness delay means for controlling the exposure time in dependence upon the brightness of an object to be photographed during a daylight exposure mode of operation, a flash circuit connectable to a flash device for firing same and including means for connecting said electric circuit means to an electrical power source in response to movement of said trigger means in said given direction to effect energization of said electromagnet and stoppage of the following movement of said movable member in one position defining a flash exposure mode, and a by-pass circuit connected in parallel with said flash circuit and operative in response to movement of said trigger means in said given direction whenever said flash circuit is disabled to connect said electric circuit means to an electrical power source to effect energization of said electromagnet and stoppage of the following movement of said movable member in another position defining a daylight exposure mode.

7. A system according to claim 6 wherein said movable member comprises a resiliently biased toothed cam cooperative with an abutment member, and means movably mounting said cam for movement controlled by said electromagnet.

* * * * *